United States Patent [19]
Findell

[11] 4,317,031
[45] Feb. 23, 1982

[54] CENTRAL FOCUS SOLAR ENERGY SYSTEM

[76] Inventor: Max Findell, 836 Rio Arriba Ave. SE., Albuquerque, N. Mex. 87123

[21] Appl. No.: 161,443

[22] Filed: Jun. 20, 1980

Related U.S. Application Data

[63] Continuation-in-part of Ser. No. 930,210, Aug. 2, 1978, abandoned.

[51] Int. Cl.³ ............................................... G01J 1/20
[52] U.S. Cl. ............................ 250/203 R; 126/425
[58] Field of Search ................... 250/203 R; 126/424, 126/425; 353/3; 356/141, 152

[56] References Cited

U.S. PATENT DOCUMENTS

| | | | |
|---|---|---|---|
| 4,013,885 | 3/1977 | Blitz | 126/425 |
| 4,063,543 | 12/1977 | Hedger | 126/425 |
| 4,146,784 | 3/1979 | Yekutieli | 250/203 R |
| 4,146,785 | 3/1979 | Neale | 250/203 R |

Primary Examiner—David C. Nelms

[57] ABSTRACT

A central focus solar energy system consisting of one or more arrays of mirrors, a receiver for each array, a sun tracker, a sun tracker sun acquisition device and a control unit. Mirrors of the arrays are subjected to two-axis control by electromechanical devices actuated by sun-tracking error signals generated by the sun tracker. Mirrors are thus oriented so as to cause reflections of the direct rays of the sun from all mirrors in an array to converge on a receiver at a common focus. Fixed (principal) axes of mirror rotation are parallel to the fixed (principal) axis of rotation of the sun tracker sensor making orientation of the system independent of the earth's spin axis. The system includes a "vernier" or fine adjustment control for positioning mirrors that supplements sun tracker controls.

10 Claims, 13 Drawing Figures

CENTRAL FOCUS SOLAR ENERGY SYSTEM

This application is a continuation-in-part of Ser. No. 930,210 filed Aug. 2, 1978, now abandoned.

BACKGROUND OF THE INVENTION

Central focus solar energy collectors include circular concentrators and heliostats. Typically a circular concentrator has a segmented or continuous parabolic-dish mirror or fresnel lens to concentrate the direct solar output on a receiver which is located at the focal point of the parabolic dish or fresnel lens. Heliostats (as in this invention) consist of a plurality of flat (or nearly flat) mirrors which are subjected to two-axis control to cause reflections of the direct rays of the sun from all mirrors to converge on a receiver. Concentrating solar energy in these ways, central focus solar energy systems typically operate at from 1000° F. to 2500° F. which is much higher than the nominal 150° F. provided by flat-plate collectors or the 500° F. characteristic of linear focus (parabolic trough) collectors. Heat is normally transferred from the receiver (or absorber) using a suitable operating fluid for storage and/or use in a thermal-to-electric conversion system. Concentrator photovoltaic cells, which directly convert some of the concentrated direct rays of the sun into electricity, may also be installed on the central focus system receiver. Using concentrated solar energy in this way, a given electrical power demand may be met with fewer expensive photovoltaic cells than would otherwise be required with no concentration. Typically silicon concentrator cells operate at from 12% to 23% efficiency in converting solar energy to electricity at concentrations of from 25 to 100 suns. AlGaAs cells have a reported potential efficiency of up to 25% at from 50 to 2000 suns. In the photovoltaic cell configuration, air or an operating fluid flowing thru the receiver, cools the photovoltaic cells for higher solar-to-electrical conversion efficiencies and transfers heat to a thermal storage unit.

Thus advantages of central focus collectors over other solar energy systems include the following:
- Higher operating temperatures than possible with flat-plate or linear focus collectors permitting:
  - Higher thermal-to-electric conversion efficiencies
  - Smaller thermal energy storage subsystems
  - More extensive industrial use of solar energy
- Optional use of concentrator (as apposed to conventional) photovoltaic cells at high sun concentrations, thereby reducing the cost of generating electricity thru the direct conversion of solar energy to electricity.

DESCRIPTION OF THE PRIOR ART

The following relevant U.S. Patents for heliostats were disclosed during a novelty search:

| U.S. Pat. No. | Inventor | Issue Date |
|---|---|---|
| 509,390 | Paine | 11/28/1893 |
| 3,466,119 | Francia | 9/09/1969 |
| 4,056,313 | Arbogast | 11/01/1977 |

Characteristically these heliostats include the following:
- A plurality of flat (or nearly flat) mirrors which are pivotably mounted and mechanically coupled so that all mirrors may be simultaneously and equally rotated about either one or both of two axes of rotation.
- Mirror support fixtures, which are pivotably mounted in fixed frameworks or other structural members to rotate about what are called mirror "principal axes" of rotation in this invention. Principal axes for all mirrors are parallel to one another and parallel to the earth's spin axis.
- A second axis of rotation for each mirror which is termed "secondary axis" in this application. These secondary axes are perpendicular to, intersect and rotate about principal axes.
- A means for initially adjusting or focusing each mirror so that during system operation, reflections of the direct rays of the sun from all mirrors converge at a common focus.
- Electromagnetic or other drive mechanisms for rotating all mirrors about their principal axes in accordance with diurnal (i.e., time-of-day) changes in the apparent position of the sun.
- Electromagnetic or other drive mechanisms for rotating all mirrors about their secondary axes to cope with seasonal changes in the sun's declination angle.

The parallel orientation of mirror principal axes of rotation with respect to the earth's spin axis is very critical for these heliostats. The smallest misalignment in this regard results in a condition wherein diurnal changes in the apparent position of the sun cannot be accomodated solely by rotating mirrors about their principal axes and declination angles solely by rotations about mirror secondary axes. Rather, for example, hour angle changes in the apparent position of the sun, will require rotation about both mirror principal and secondary axes to maintain sun reflections from all mirrors on the common focus.

This criticality of alignment factor has greatly limited the practical use of heliostats.

One objective of the present invention is to provide a central focus solar energy (heliostat) system which may be randomly oriented with respect to the earth's spin axis. With the criticality of alignment factor removed, this invention offers a broad potential for satisfying energy needs. For example, systems making use of this invention may be installed, using home-construction skills, in or on virtually any new or existing structure (with reasonable exposure to the direct rays of the sun) to meet electrical and space and water heating needs.

In addition to the criticality of alignment factor, other reasons why heliostats have not been used extensively to meet energy requirements are that they are characteristically relatively complex, expensive to produce and maintain and inherently unreliable. Accordingly, yet another objective of this invention is to provide a central focus solar energy system which is, by comparison, simple, has a potential for high reliability and is inexpensive to produce and maintain.

Another objective of the present invention is to provide a fundamental design which may be applied flexibly to assemble central focus solar energy systems of virtually any desired capacity to meet a variety of energy needs.

Still another objective of the present invention is to provide a sun tracker and receiver which uniquely control rotations of a plurality of mirrors to maintain reflections of the direct rays of the sun from all mirrors on a receiver at the common focus.

SUMMARY OF THE PRESENT INVENTION

The above and other objectives are met in the present invention for a central focus solar energy system with one or more arrays of mirrors, a receiver centered over each array, a sun tracker, a sun tracker sun-aquisition device and a control unit. Array mirrors are subjected to two-axis control by the sun tracker, the receiver or sun tracker sun-acquisition device thru the control unit to cause reflections of the direct rays of the sun from all mirrors of each array to converge of the receiver for that array.

Like heliostats previously discussed, mirrors included in arrays of the present invention are pivotably mounted to rotate about fixed, parallel principal axes and secondary axes which are perpendicular to, intersect and rotate about these principal axes. While mechanical coupling, mirror focusing and other means in the present invention and referenced heliostats are dissimilar, the main differences in the present invention are the inclusion of a sun tracker and a receiver-mounted mirror reflection feed-back system.

The sun tracker provides one means for controlling mirror rotations. Sun-tracking error signals, generated by the sun tracker sensor, are inputs to the control unit which sends command pulses to stepping motors causing the sensor to rotate to eliminate sun tracking errors. These same command pulses are also transmitted to mirror control stepping motors causing all mirrors to simultaneously rotate in the same direction about corresponding axes. The sun tracker sensor is pivotably mounted to rotate about a "sensor principal axis" with a fixed orientation in the sun tracker and a "sensor secondary axis" which is perpendicular to, intersects and rotates about the sensor principal axis. As a primary design requirement of the present invention, all mirror principal axes must be parallel to the sensor principal axis. It is not required that these principal axes be parallel to the earth's spin axis. As long as mirror principal axes are parallel to the sun tracker sensor principal axis there is no limit to the number of mirrors that may be controlled by the sun tracker thru the control unit. Also there is nothing in the design that limits the size of mirrors used in arrays or dictates the separation distance of mirrors and the receiver.

The receiver-mounted mirror reflection feed-back system provides a "vernier" control capability for the system. Following initial mirror positioning under sun tracker control, this vernier control system causes further mirror orientation adjustments to center mirror reflections of the direct rays of the sun on the receiver surface.

For most applications, environmental protection is provided system components thru the use of transparent glass or plastic covers. Such covers should practically eliminate system maintenance requirements and and enhance system reliability without significantly reducing the amount of solar energy available to the system. The underside of system arrays is enclosed using either an opaque or translucent material to shield out all, or most of, the sunlight passing between mirrors; or transparent plastic or glass to permit residual direct rays and the diffuse component of solar radiation to pass thru the arrays. The latter configuration lends itself to cathedral ceiling installations in dwellings or use of mirror arrays in a greenhouse roof.

The receiver for each array of mirrors is normally centered over the array at a distance which is great enough to preclude reflections of the direct rays of the sun from any mirror of the array illuminating the back of an adjacent mirror. The distance is a function of the number and size of array mirrors and the separation distance between mirrors. In general receivers for arrays with small mirrors (for example: square mirrors measuring 5 cm or less on a side) may be positioned inside of transparent protective covers. It is usually more practical to have receivers outside of protective covers for arrays with larger mirrors.

Other objectives, applications and unique features of the present invention become apparent from the Description of the Preferred Embodiment.

DESCRIPTION OF THE PREFERRED EMBODIMENT

Figure 1:
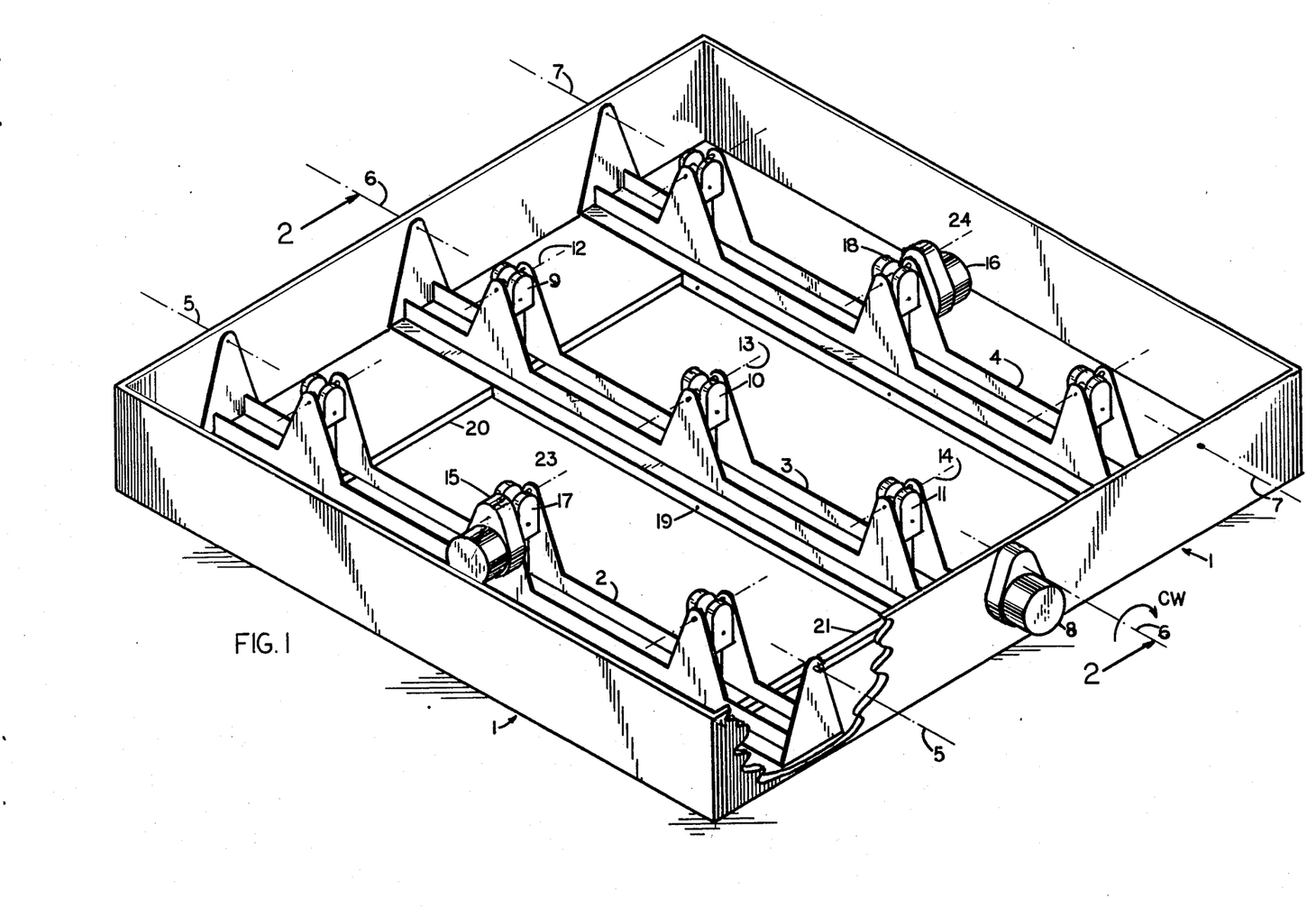
FIG. 1 is an isometric view of a typical mirror array with mirrors removed.

FIG. 1 shows a typical mirror array with mirrors removed to expose mechanical coupling means. Details regarding mirror installations are provided later. The mirror array supported by framework 1 includes three mirror principal axis control brackets 2, 3 and 4. Brackets 2 and 4 are pivotably mounted at both ends in framework 1 to rotate about mirror principal axes of rotation 5 and 7. Bracket 3 is a shaft-coupled to mirror principal axis control motor 8 at one end and pivotably mounted in framework 1 at the other end, to rotate about mirror principal axis of rotation 6. Motor 8 is mounted on framework 1 and provides a means for rotating bracket 3 in either a clockwise (CW) or counterclockwise (CCW) direction about axis 6. Axes 5, 6 and 7 are parallel and in a common plane.

Three mirror articulating arms, 9, 10, and 11 for example, are pivotably mounted between mirror-image sides of each bracket, bracket 3 for example, for rotation about mirror secondary axes of rotation 12, 13, and 14. Mirror secondary axes of rotation for all arms on a given bracket are in a common plane and are perpendicular to and intersect the mirror principal axis of rotation about which that bracket rotates. Axes 12, 13, and 14 are in a common plane and are perpendicular to and intersect axis 6. As later described in detail, a mirror is coupled to each mirror articulating arm. After the initial mirror-focusing adjustment, which is also reviewed later, angular changes in the position of all mirrors is made thru mirror articulating arms. Secondary axis control motors 15 and 16 are mounted on brackets 2 and 4 and are shaft-coupled to arms 17 and 18 respectively. Mirror arrays are not restricted to the three brackets, three articulating arms per bracket or three motors shown in FIG. 1.

Figure 2:
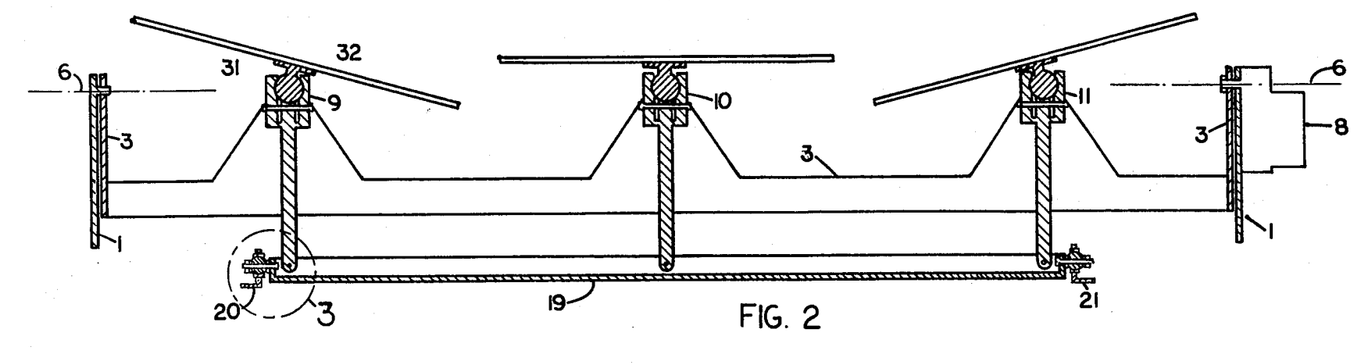
FIG. 2 is a sectional view of the mirror array of FIG. 1.
Figure 3:
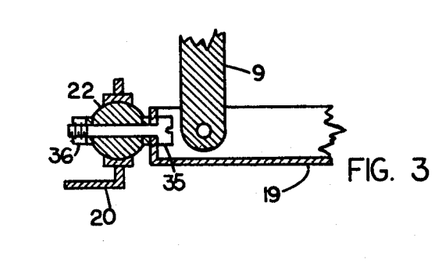
FIG. 3 is an enlarged sectional view of a portion of FIG. 2.

All articulating arms in the array are dimensionally identical and, as shown in FIG. 2 for bracket 3, all arms mounted on a given bracket are pivotably coupled near the base of the arm to a mirror control bar 19. Corresponding ends of each mirror control bar in an array are coupled by tie rods 20 and 21. Referring to FIG. 3, bar-to-tie rod couplings include a spherical bearing, for example 22, to insure a snug, two-axis union.

Returning to FIG. 1, all mirrors of the array are rotated about mirror principal axes of rotation by motor 8 thru the hereinbefore described mechanical coupling means as follows: When activated, motor 8 rotates bracket 3 and mirror control bar 19 about axis 6 in either a clockwise or counterclockwise direction. Tie rods 20 and 21 mechanically transmit this rotational movement to all other mirror control bars in the array causing the simultaneous and equal rotation of brackets 2 and 4 about axes 5 and 7 respectively. This rotational movement is transmitted mechanically to all mirror articulating arms causing all to simultaneously and equally rotate about their respective principal axes.

Array mirrors are rotated about mirror secondary axes of rotation by secondary axis control motor 15 and 16 as follows: When activated, motors 15 and 16 simultaneously and equally rotate arms 17 and 18 in the same direction about mirror secondary axes of rotation 23 and 24 respectively. This rotational movement is mechanically transmitted thru mirror control bars 19 and tie rods 20 and 21 causing the simultaneous and equal rotation of all mirror articulating arms (and coupled mirrors) about their respective secondary axes of rotation. At least two mirror secondary axis control motors are required for each array to insure equal movement of all mirror control bars. Note that in order to rotate all arms in the same direction, shafts of motors 15 and 16 must rotate in opposite directions, as viewed from the back of each motor.

Figure 4:
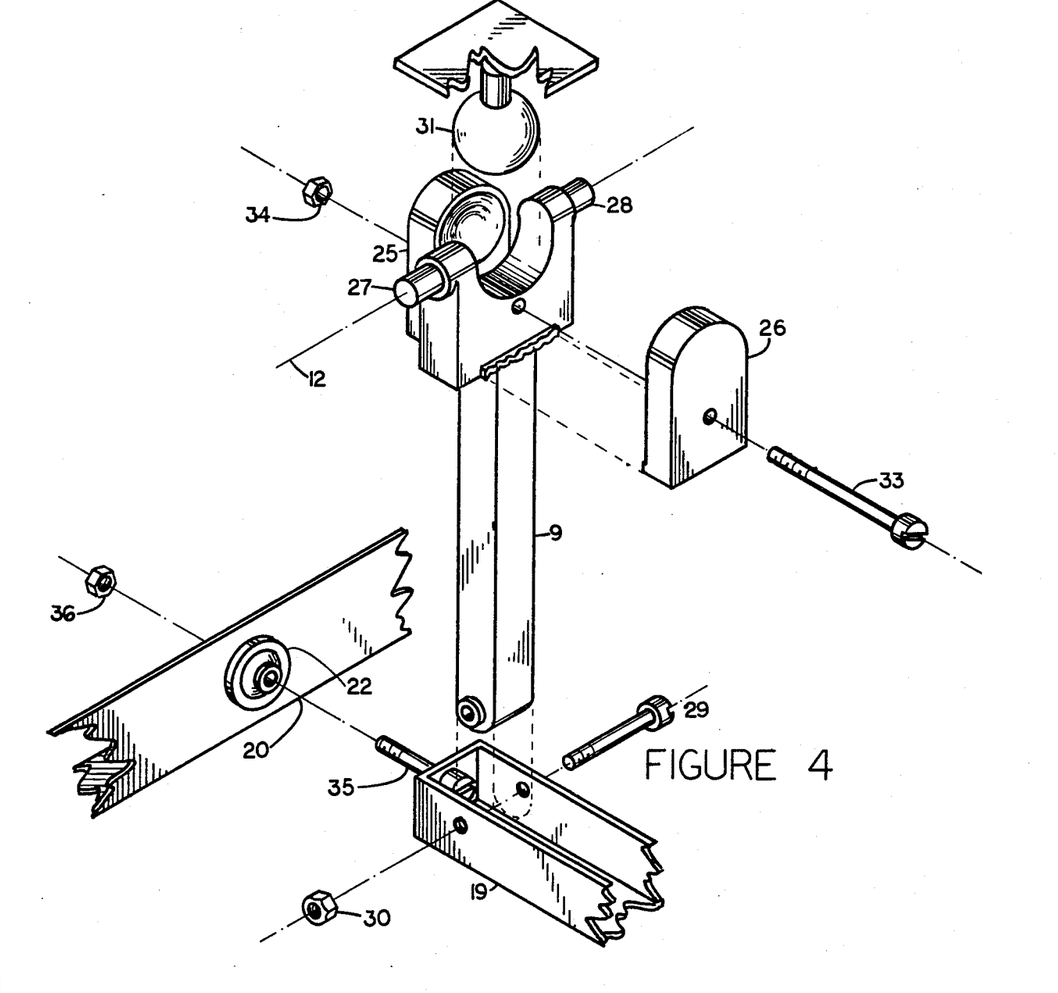
FIG. 4 is an isometric view of a mirror articulating arm and associated components.

Mirror articulating arm 9 and associated components are shown in FIG. 4. The two halves of the mirror focusing ball sockets 25 and 26 are part of arm 9. Arm 9 is pivotably mounted in bracket 3 by inserting secondary axis shafts 27 and 28 into shaft holes in bracket 3. Mirror control bar 19 is attached to the base of arm 9 using machine screw 29 and secured by nut 30. Mirror focusing ball 31 with mirror 32 attached (FIG. 2) is installed between and in the ball recesses of ball socket halves 25 and 26. Machine screw 33 is inserted thru arm 9 and nut 34 tightened to couple ball 31 to arm 9. Tie rod 20 is coupled to bar 19 by inserting machine screw 35 thru bar 19 and spherical bearing 22 and tightening nut 36. To focus mirror 32, nut 34 is loosened to permit the rotational movement of ball 31 in the ball socket. Mirror 32 is then manually positioned by rotating ball 31 in the ball socket to cause reflections from a suitable light source from the center of the mirror 32 to intersect the center of the common focus. Nut 34 is then retightened. All other array mirrors are similarly coupled to articulating arms and focused.

Figure 5:
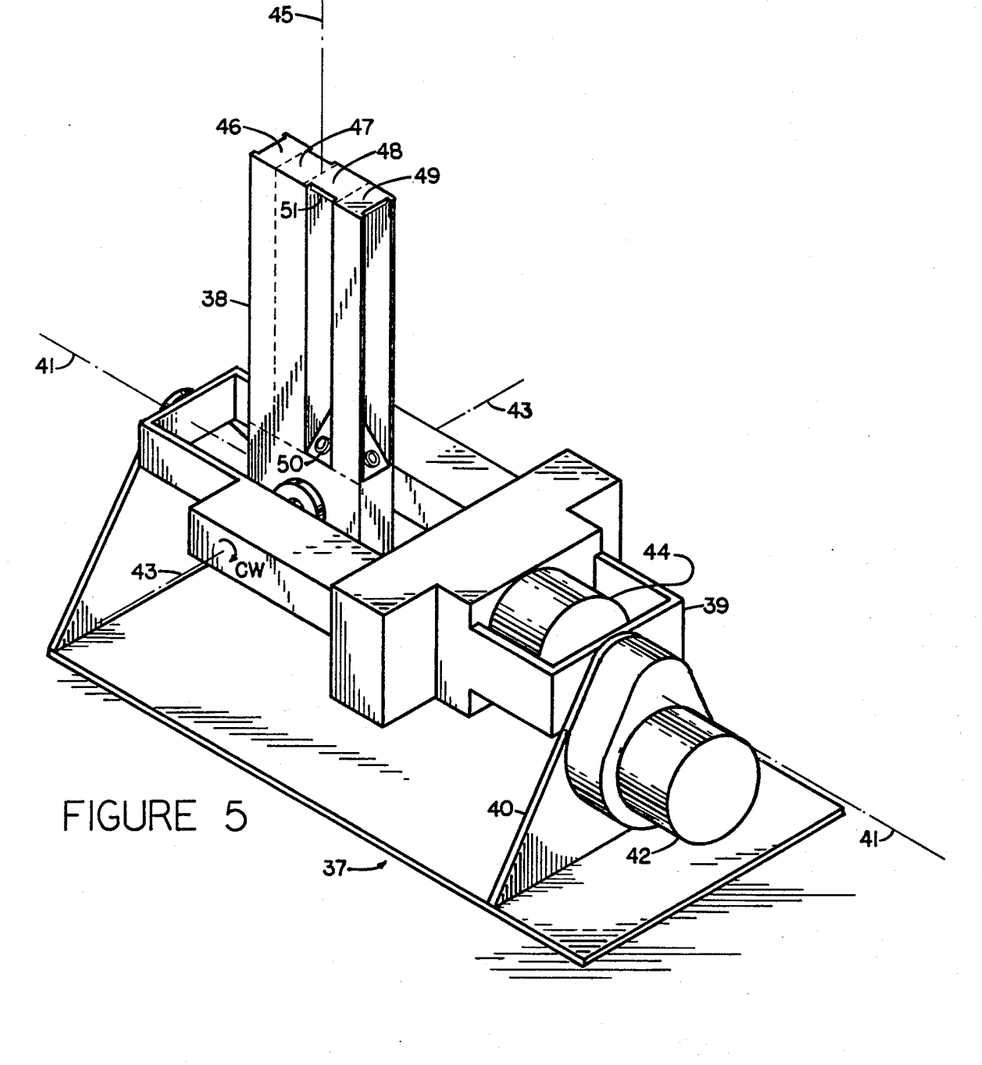
FIG. 5 is an isometric view of the sun tracker.
Figure 7:
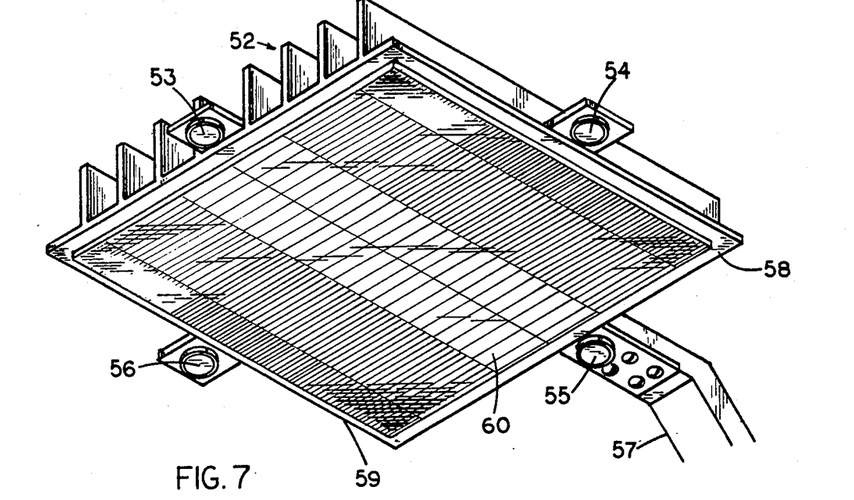
FIG. 7 is an isometric view of a typical air-cooled receiver.
Figure 7A:
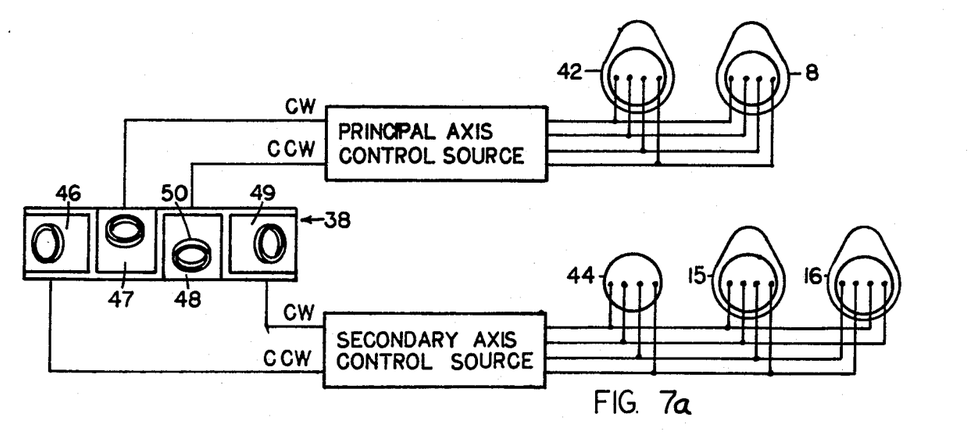
FIG. 7a is a simplified block diagram of sensing and control units.

Referring to FIGS. 5 and 7a, and sun tracker 37 tracks the sun by rotating the sun tracker sensor 38 about two orthogonal axes of rotation, identified as sensor principal axis 41 and sensor secondary axis 43.

Gimbal 39 is pivotably mounted in support 40 to rotate about sensor principal axis 41. Sensor principal axis control motor 42 is mounted on support 40 and provides a means for rotating gimbal 39 about axis 41 in either a clockwise or counterclockwise direction.

Sun tracker sensor 38 is pivotably mounted in gimbal 39 for rotation about sensor secondary axis 43. Sensor secondary axis control motor 44, mounted in gimbal 39, thru a suitable gear train (not shown) provides a means for rotating sensor 38 about axis 43 in either a clockwise or counterclockwise direction. Axis 43 is perpendicular to axis 41, intersects axis 41 at the center of rotation of sensor 38 and rotates about axis 41 with gimbal 39. The sensor longitudinal axis 45 is perpendicular to the plane of axes 41 and 43 and passes thru the center of rotation of sensor 38.

Sensor 38 includes four contiguous compartments: 46, 47, 48 and 49. Each compartment includes a light-sensitive device. Light-sensitive devices detect sun-tracking errors. A sun-tracking error is defined as any misalignment of longitudinal axis 45 and a straight line connecting the sensor center of rotation and the center of the sun. A sun-tracking error, detected by one of these light-sensitive devices and transmitted to the control unit (described later in detail), causes either motor 42 or motor 44 to rotate sensor 38 to eliminate the error. An example of how the sun tracker operates follows: Light-sensitive device 50 is mounted in compartment 48. Sun-shadowing fence 51, at the sun end of compartment 48, shades device 50 from the direct rays of the sun under a condition of no sun-tracking error. Should the apparent position of the sun change so as to cause device 50 to be illuminated by the direct rays of the sun, device 50 will generate a sun-tracking error signal, causing motor 42 to rotate gimbal 39 and sensor 38 in a counterclockwise direct (as viewed from motor 42) about axis 41 until fence 51 again shades device 50 from the direct rays of the sun.

Sun-tracking errors detected by light-sensitive devices included in other compartments cause the sensor 38 to be rotated in other directions. An error detected by the light-sensitive device installed in compartment 47 (termed: a compartment 47 error) causes motor 42 to rotate the sensor about axis 41 in a clockwise direction. A compartment 46 error causes motor 44 to rotate the sensor about axis 43 in a counterclockwise direction. The clockwise direction about axis 43 is indicated by CW in FIG. 5. A compartment 49 error causes motor 44 to rotate the sensor about axis 43 in a clockwise direction.

Figure 6:
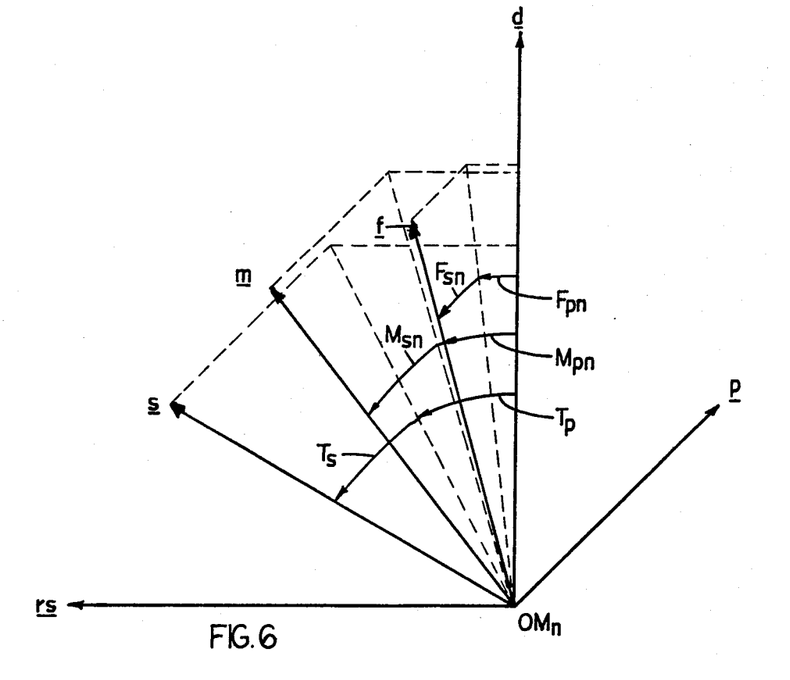
FIG. 6 is a diagram of the sun-mirror-common focus geometry.

It should now be recalled that mirror principal axis control brackets (FIG. 1) are pivotably mounted in framework 1 to rotate about mirror principal axes and the sun tracker gimbal 39 is pivotably mounted in support 40 to rotate about sensor principal axis 41. As a primary requirement of this invention, the sensor principal axis 41 must be parallel to all mirror principal axes (i.e., axes 5, 6, and 7). Since the sun's rays are essentially parallel to one another, the physical separation of the sun tracker and mirror arrays is not critical. Regardless of the separation distance (in a terrestrial application) the direction to the sun from the centers of rotation of the sensor and any mirror of the array is essentially the same. Because of this characteristic of the sun's rays and the principal axis parallelism criterion, FIG. 6 properly shows the geometry for both the sun tracker sensor and any mirror, n, of the array as follows:

- $CM_n$, the origin, is the center of rotation of mirror, n, the center of rotation of sensor 38 and the center of the reflective surface of mirror n. Due to physical limitations of mirror articulating arms, centers of rotation and reflectance are not in exact coincidence for mirror n; however, the separation of these centers is small, has negligible affect on system operation, and is therefore considered zero.
- Axis p is the mirror n principal axis and the sensor principal axis. Axis rs, the reference secondary axis, is in the plane of mirror principal axes and perpendicular to p. Axis d completes the orthogonal axis system.
- Unit vector s points toward the sun with direction defined by sun tracker sensor tracking angles $T_p$ and $T_s$; wherein, $T_p$ is measured about axis p in the d-rs plane and $T_s$ in a plane perpendicular to the d-rs plane. Unit vector $f_n$, which points at the center of the common focus from the center of mirror n has it's direction similarly described by angles $F_{pn}$ and $F_{sn}$. Unit vector $m_n$ is perpendicular to the reflective surface of mirror n with direction angles $M_{pn}$ and $M_{sn}$.

With $M_{pn}$ and $M_{sn}$ of such value as to cause reflections of the direct rays of the sun from the center of mirror, n, to intersect the center of the common focus, by the physical laws of reflective surfaces, s, f and m lie in a common plane and m bisects the angle between s and f. Thus in the d-rs plane:

$$\frac{T_p - F_{pn}}{2} = M_{pn} - F_{pn}, \text{ and} \quad (1)$$

$$M_{pn} = \frac{T_p}{2} + \frac{F_{pn}}{2}$$

Similarly, $$M_{sn} = \frac{T_s}{2} + \frac{F_{sn}}{2} \quad (2)$$

Mirror, n, is focused using a suitable light source (such as a laser) with beam directed at $OM_n$ and coincident with axis d. This beam orientation simulates the condition of $T_p = T_s = 0$. With the longitudinal axis of the mirror articulating arm parallel to axis d, mirror, n, is manually rotated about axes p and rs to cause the reflected beam to intersect the center of the common focus. Substituting $T_s = T_p = 0$ in equations (1) and (2) provides the two fixed focus angles for mirror, n.

$$M_{pn(focus)} = \frac{F_{pn}}{2}, \text{ and}$$

$$M_{sn(focus)} = \frac{F_{sn}}{2}$$

Note that each mirror of the array has a different set of fixed focus angles. Since focus angles are constants, from equations (1) and (2):

$$\frac{d}{dt} M_{pn} = \frac{1}{2} \frac{d}{dt} T_p \quad (3)$$

$$\frac{d}{dt} M_{sn} = \frac{1}{2} \frac{d}{dt} T_s \quad (4)$$

Since mirror n is any mirror of the array, equations (3) and (4) apply to all mirrors of the array.

Equations (3) and (4) thus describe the relationship that must exist between the sensor 38 and array mirror rotations in order to maintain reflections of the direct rays of the sun from all array mirror on the common focus as the apparent position of the sun changes.

To meet the requirements of equations (3) and (4) all motors used in this invention for rotating the sensor 38 (motors 42 and 44) or array mirrors (motors 8, 15 and 16) are electrically-compatible stepping motors (also called stepper motors or step motors) with suitable gear reductions. Motors of this type that rotate with great precision in either direction thru fixed angular increments in response to input command pulses are readily available in the commercial market. Precise angular control of multiple motors being driven from the same source of command pulses can be maintained without feedback. When the desired position is reached, command pulses cease, the motor shaft stops rotating and there is no need for clutches or brakes. Once stopped, the motors resist dynamic movement up to the value of holding torque. For principal axis control, the gear reduction for motor 42 is one-half that of motor 8 as required by equation (3). Similarly, the gear train (not shown) included in gimbal 39 for motor 44 provides a gear reduction which is one-half of motors 15 and 16 according to equation (4).

The present invention provides electrical feedback in the mirror control/sun tracker loop by including (see FIG. 7) four light-sensitive devices 53 thru 56 in receiver 52. Receiver 52 is installed on receiver support arm 57; centered over and a suitable distance from the array of mirrors with the square, array-facing surface 58 (which is approximately the same size as an array mirror) parallel to the plane of array mirror centers of rotation; and with one edge 59 of array-facing surface 58 parallel to mirror principal axes of rotation. With reflections of the direct rays of the sun from all array mirrors properly centered on array-facing surface 58, none of the feedback loop photocells is illuminated by mirror reflections. The illumination of any of the feedback loop photocells by mirror reflections causes mirror control motors to rotate mirrors so as to center mirror reflections on the array-facing surface of the receiver. With edge 59 parallel to mirror principal axes of rotation, photocells 54 and 56 provide "vernier" control over mirror principal axis control motor 8 and photocells 53 and 55 over mirror secondary axis control motors 15 and 16. A typical concentrator photovoltaic cell 60 is shown mounted on the array-facing surface 58. As an alternative to the air-cooled receiver 52 with cooling fins shown in FIG. 7, a fluid-cooled heat exchanger may be used in the present invention. The feedback-loop photocell installation for a fluid-cooled receiver is similar to that shown in FIG. 7.

The present invention also provides a sun tracker sun-acquisition aid capability by including sun tracker tilt detection and AM/PM time-of-day detection circuits. These additional circuits detect anomalies between sun tracker sensor orientation and the time of day (AM or PM) and cause sun tracker and mirror control motors to correct these errors. This capability is provided thru use of two mercury switches mounted in the sun tracker and two photocells installed on the mirror array framework. One photocell has a field-of-view pointed approximately to the east while the other "looks" in a westerly direction. Mercury switches in the sun tracker sensor are so mounted as to be sensitive to rotations about either the sensor secondary or principal axis depending on system orientation as follows:

If principal axes are pointed in approximately a north-south direction, mercury switch are installed so as to be sensitive to sensor orientation about the sensor principal axis.

For a system with principal axes pointed more nearly in an east-west direction, mercury switches are mounted so as to be sensitive to sensor secondary axis orientation.

In either case, both mercury switches are oriented in the sensor so as to be open at solar noon.

Figure 8:
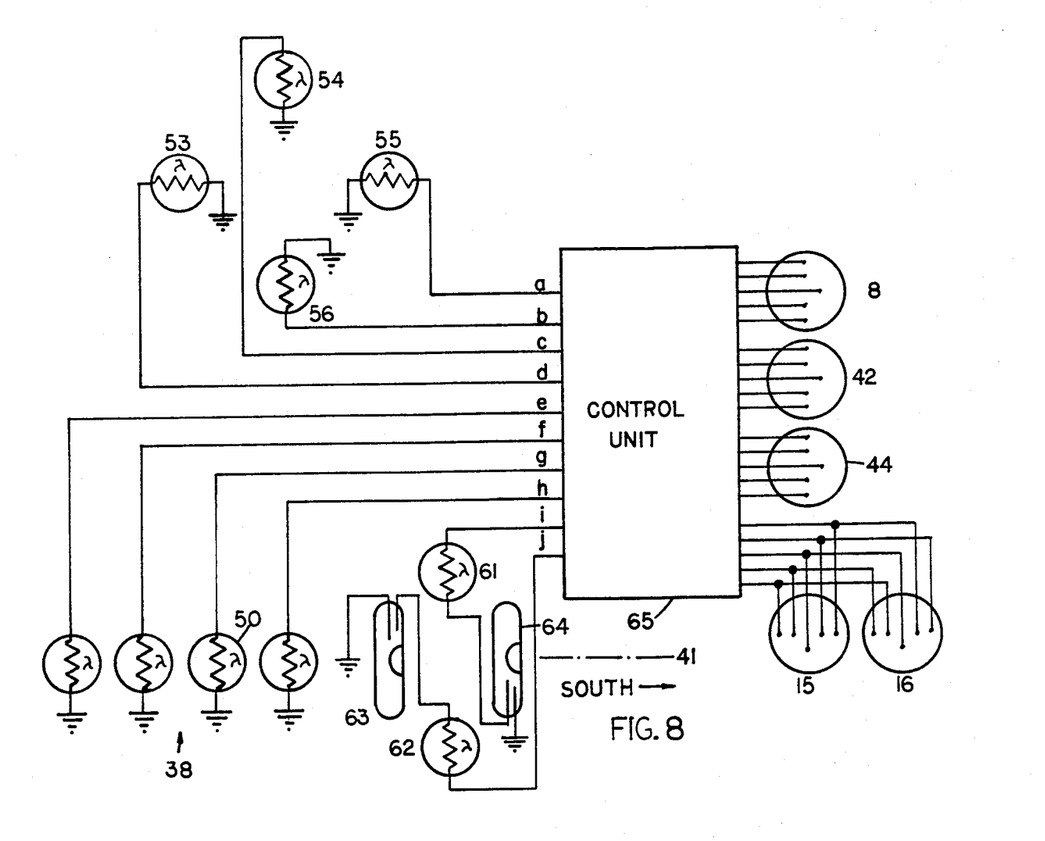
FIG. 8 is a simplified block diagram of the electrical system.

In FIG. 8 for example, principal axes are oriented in a north-south direction with photocell 61 pointed to the east and photocell 62 to the west. Mercury switches 63 and 64 are thus mounted so as to be sensitive to sensor principal axis orientations such that a sensor easterly tilt closes mercury switch 63 and a westerly tilt closes switch 64. Note that photocell 61 is electrically connected to mercury switch 64 and photocell 62 to mercury switch 63. Accordingly, for example, if photocell 61 is illuminated by the direct rays of the sun and switch 64 is closed a signal indicative of this anomaly is transmitted to the control unit 65. Note in FIG. 8 that all photocell circuits provide inputs (a thru j) to the control unit 65. The control unit, in response to these inputs, transmits command pulses to sun tracker motors 42 and 44 and mirror control motors 8, 15 and 16.

Figure 9:
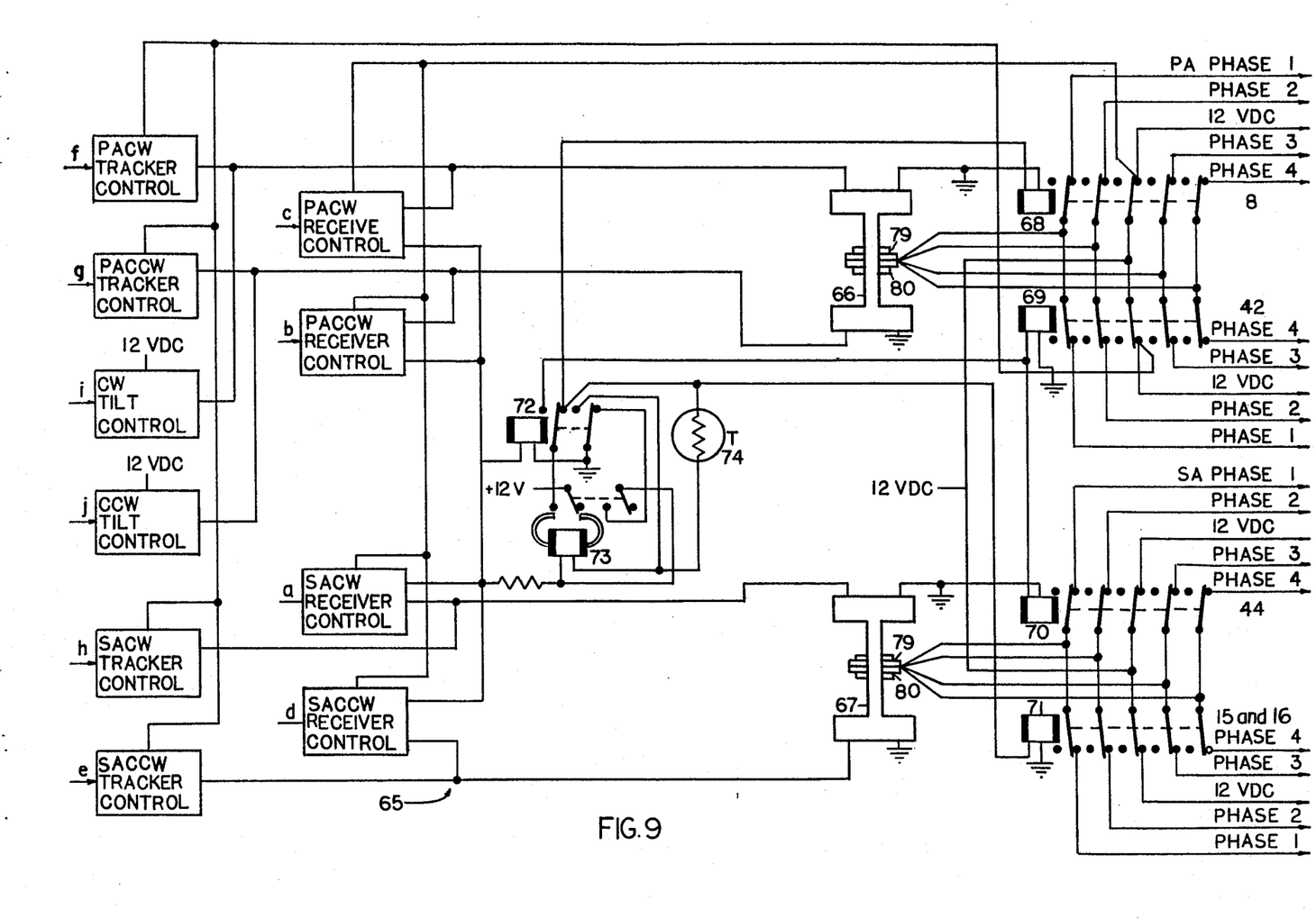
FIG. 9 is a simplified block diagram of the control unit
Figure 10:
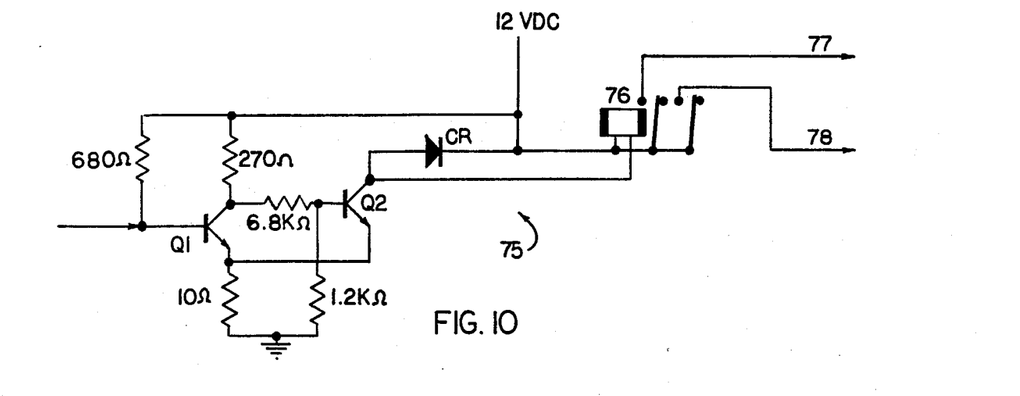
FIG. 10 is a block diagram of a typical control element

Referring to FIG. 9, each control unit 65 input, a thru j, is routed to a "control element". For example, input f is connected to the Principal Axis Clockwise Tracker Control Element (shortened in FIG. 9 to: "PACW Tracker Control"). Each control element is designated in FIG. 9 by the reference letter assigned to the input and includes a trigger circuit 75 (FIG. 10) which is activated when the input-to-ground electrical resistance drops below a level defined by elements of the trigger circuit. Illumination of photocell input circuits a thru h by the direct rays of the sun reduces the input-to-ground electrical resistance below this level thereby activating the associated trigger circuit 75. Activation of trigger circuits with input i and j requires illumination of the proper photocell, 61 or 62, and closure of the proper mercury switch, 64 or 63, as is evident in FIG. 8. Activation of a trigger circuit cause the associated control element double-pole relay 76 to close thereby generating two 12 VDC output signals 77 and 78.

One output signal 77 circuit from each control element is routed to either of two bi-directional solenoid rotary switches 66 and 67. Each rotary switch 66 and 67 has two solenoids. One solenoid in each rotary switch, when activated by a 12 VDC signal 77 from a control element, causes the switch rotor to advance thru consecutive positions in a clockwise (CW) direction as long as the signal is applied. The other solenoid in each rotary switch, when so activated, advances the rotor in a counterclockwise (CCW) direction. Rotary switch 66 responds to signal 77 from principal axis designated control elements (b,c,f and g) and (in the principal axis orientation of FIG. 8) tilt control elements i and j. Rotary switch 67 is activated by signals 77 from secondary axis designated control elements (a,d,e and h).

Figure 11:
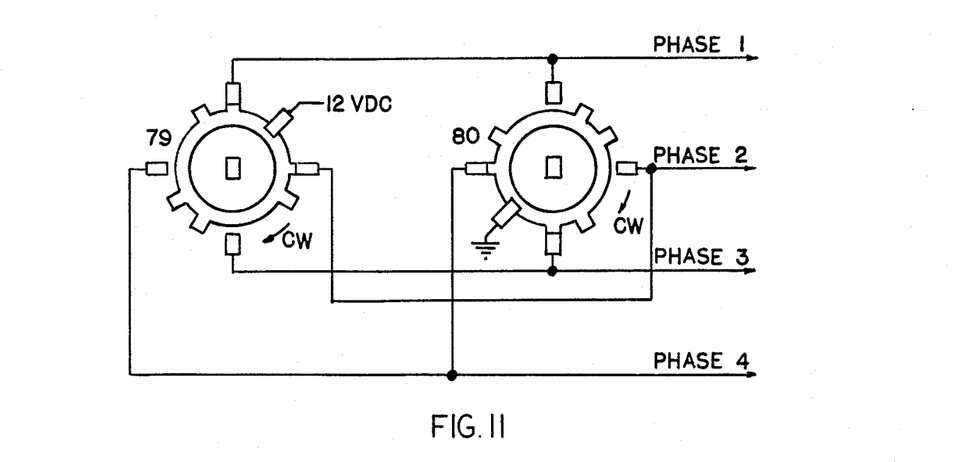
FIG. 11 is a diagram of two rotary switch sections

Two 12-position switch sections 79 and 80 rotate with the rotor of each rotary switch 66 and 67 as shown in FIG. 11. Switch section 79 applies a 12 VDC signal to two of the four rotary output terminals (designated: Phase 1, Phase 2, Phase 3 and Phase 4). Switch section 80 applies zero (ground) voltage to the other two rotary switch output terminals. Switch sections 79 and 80 are configured to apply signals to the rotary switch output terminals in the following sequence when the switch rotor is advanced by the solenoid in a clockwise (CW) direction:

| Rotor Position | Phase | | | |
|---|---|---|---|---|
| | 1 | 2 | 3 | 4 |
| a (FIG. 11) | 12V | 12V | 0 | 0 |
| b | 12V | 0 | 0 | 12V |
| c | 0 | 0 | 12V | 12V |
| d | 0 | 12V | 12V | 0 |

Counterclockwise rotor advances reverse the above sequence.

These switch sections 79 and 80 in rotary switches 66 and 67 provide commands to 4-phase stepping motors used to control sun tracker sensor and mirror rotations. Each sequential change in signals from a rotary switch 66 or 67 causes motor shafts in associated stepping motors to rotate thru one angular increment (or step). Commands generated in switch 66 are transmitted thru 5-pole relays 68 and 69 to motors 8 and 42 and commands generated in switch 67 are routed thru relays 70 and 71 to motors 44, 15 and 16. Functions of relays 68 thru 71 are described later.

12 VDC signal 78 from control elements a, b, c, and d (receiver control elements) are inputs to relay 72 and latching relay 73 such that a signal from any of these control elements closes relay 72 and latches 73 in the left hand position. Relays 72 and 73 are shown in the normal-operating, right hand position in FIG. 9. Closure of these relays in this way has the effect of applying a 12 VDC signal to relays 69 and 70 thereby opening command signal circuits to sun tracker motors 42 and 44 and removing 12 VDC power from sun tracker control elements e, f, g, and h. The sun tracker is thus immobilized when any receiver photocell is illuminated by the direct rays of the sun. The purpose of this function is to permit vernier mirror adjustments under receiver control without sun tracker "interference".

After vernier adjustments are complete, receiver control element (e, f, g, and h) signals stop and relay 72 returns to its drop-out (right hand position in FIG. 9) configuration but 73 remains temporarily latched in the left hand position. With relays 72 and 73 in this configuration, relays 69 and 70 drop out thereby restoring command signal circuits to sun tracker motors 42 and 44 and applying power to sun tracker control elements, e, f, g, and h. Also, relays 69 and 71 are activated thereby opening command signal circuits to mirror control motors 8, 15 and 16 and removing power from receiver control elements. The purpose of this function is to permit the sun tracker to eliminate sun-tracking erros without disturbing the orientation of mirrors (which are already correctly positioned by receiver control circuits).

After a short delay, provided by thermistor 74, relay 73 is latched in the right hand position restoring command signal circuits to mirror control motors.

Normal operation of the system during the day is as follows:

Just prior to sunrise the system will be oriented as it was following the previous days operation—normally pointed toward the sunset.

Assuming principal axes are in a north-south orientation (as in FIG. 8), at sunrise, photocell 61 will be illuminated by the direct rays of the sun and if switch 64 is closed (i.e., with the sun tracker sensor tilted to the west), input i to the control unit 65 will be activated. The Tilt CW Control now transmits a 12 VDC signal to bi-directional solenoid rotary switch 66 causing it to rotate its 12-position rotor in a clockwise direction sending clockwise rotation commands to mirror principal axis control motor 8 and sensor principal axis control motor 42. Tilt CW Control has the capability of taking the system to the sensor solar noon position (at which orientation switch 64 will open); however, before the sun tracker sensor is in this position, the sensor field-of-view is such that the sensor will have "acquired" the sun and taken control of the system.

Sun tracker control element inputs to the control unit now control rotations of array mirrors and the sun tracker sensor about both principal and secondary axes until mirror reflections of the direct rays of the sun illuminate one or more receiver photocells.

Normally during the daily period of initial sun acquisition, receiver photocells 54 and 53 or 55 will be illuminated by array mirror reflections. This illumination in addition to immobilizing the sun tracker as previously discussed, causes mirror control motor 8 to further rotate all mirrors about their principal axes and depending on whether 53 or 55 is illuminated, motors 15 and 16 to rotate all mirrors about their secondary axes in either a clockwise (55 illumination) or counterclockwise (53 illumination) direction.

When all mirror reflections of the sun are properly centered on the array-facing surface of the receiver, none of the receiver photocells will be illuminated, mirror control motors are temporarily immobilized and the sun tracker is activated.

The sun tracker sensor is now automatically rotated about its principal and secondary axes until its longitudinal axis is precisely pointed at the center of the sun. Following the short time delay required for these sun tracker sensor rotational adjustments, mirror control motors are reactivated.

With the sun tracker sensor precisely pointed at the sun and all array mirror reflections of the direct rays of the sun correctly centered on the array-facing surface of the receiver, the system now operates in its normal mode of control by the sun tracker.

Should the sun become obscured and the sun tracker unable to effect control during a prolonged period, it is necessary for the system to reacquire the sun when the obscuration passes using system capabilities previously described as follows:

For brief periods of no sun, reacquisition can be accomplished using receiver control.

Longer periods of no sun may necessitate use of both the sun tracker and receiver control.

Very long periods of no sun may activate tilt control followed by sun tracker and receiver control.

Figure 12:
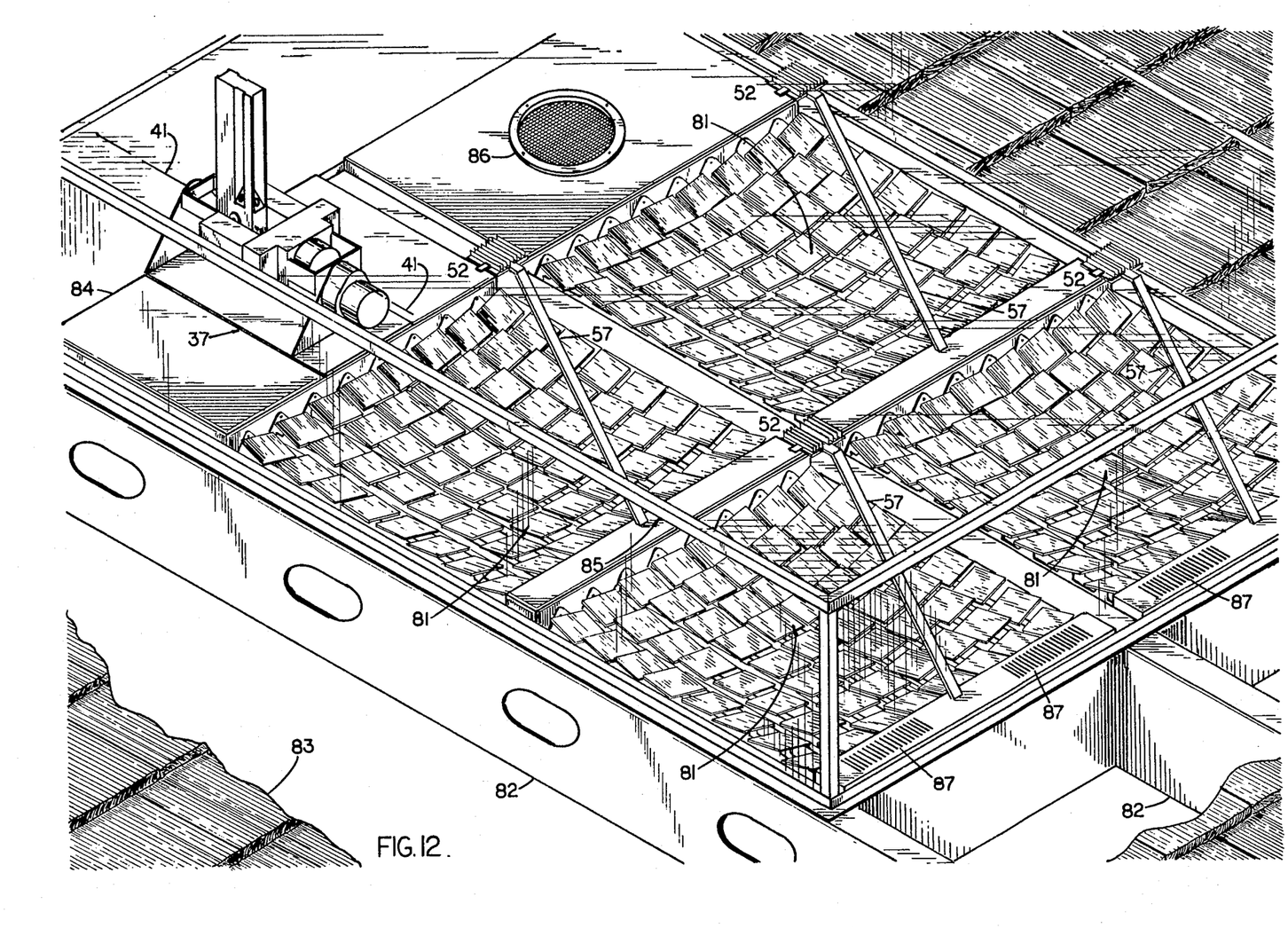
FIG. 12 is an isometric view of principal components of the present invention typically assembled into a small central focus solar energy system

Components of the present invention are shown typically assembled into a small central focus solar energy system in FIG. 12. Four mirror arrays 81, each with sixty-four small identical flat square mirrors, are installed between steel framing rafters 82 of pitched-roof 83 with mirror principal axes parallel to rafters 82. Sun tracker 37, fastened to control unit cover 84 is mounted with sun tracker principal axis 41 parallel to rafters 82. An air-cooled receiver 52, mounted on receiver support arm 57 is centered over each mirror array 81. All system components are under transparent cover 85. Fan 86 draws air thru vents 87 to cool receivers 52. At a standard peak solar insolation of 1000 watts per square meter and assuming a mirror reflectance of 0.90 and a cover transmittance of 0.90, the system shown in FIG. 12 with four centimeter mirrors will provide a total peak power of approximately 315 watts (thermal) at the four receivers. Concentrator photovoltaic cells, with a 0.16 solar-to-electric conversion efficiency, installed in receivers will generate approximately a peak power of 50 watts (electric).

As previously indicated, the minimum separation distance between mirrors and the receiver required to preclude reflections of the direct rays of the sun from any mirror of the array illuminating the back of an adjacent mirror under the most critical sun/receiver position geometry, is dependent on the number, size and separation distance of array mirrors. For arrays shown in FIG. 12 with a uniform mirror separation distance of six millimeters, the mirror-receiver distance is approximately twenty-three centimeters which is small enough to make it practical to include receivers inside protective transparent covers. For systems designed to provide higher solar energy fluxes using a greater number of and/or larger mirrors, the receiver is outside of the protective covers. For example: for a one hundred and forty-four mirror array of thirty centimeter square mirrors separated by nine millimeters, the mirror-receiver distance is about 5.75 meters which is to large to make it practical to position the receiver inside the protective cover. Following the same assumptions as before, this later system would provide a peak power of approximately 9250 watts (thermal)/1480 watts (electric) at the receiver which is outside of the protective cover. If use is to be made of receiver thermal energy, this external-cover receiver should include a heat exchanger and a fluid circulation system.

This preferred embodiment of the present invention is intended as an example of the application of design concepts for a unique type of central focus solar energy system. There may be departures from the design shown which seem to differ substantially from the preferred embodiment but which are really based entirely on design concepts specified in the appended claims.

What is claimed is:

1. A central focus solar energy system whose operation is independent of the alignment of said system with respect to the spin axis of the earth, said system comprising:

at least one mirror array means positioned to receive direct rays of the sun, each said mirror array means including a mirror array framework, said mirror array means including a plurality of rotatable mirrors for reflecting the direct rays of the sun on a common focus, said mirrors being mounted within said framework so that principal axes of rotation of mirrors are parallel and secondary axes of rotation of said mirrors are perpendicular to, intersect and rotate about said mirror principal axes of rotation at the center of rotation for each said mirror, said mirror array means including electromechanical positioning means for reorienting said mirrors in keeping with changes in the apparent position of the sun;

a control unit means connected to components of the system for receiving electrical signals therefrom and generating electrical control signals in response thereto, said control unit being connected to each said mirror array means for transmitting electrical control signals to said electromechanical means to cause rotations of said mirrors;

a sun tracker means electrically connected to said control unit that includes a sensor means for viewing the sun and generating electrical signals indicative of the misalignment of said sensor with respect to the sun that are transmitted to said control unit, said sun tracker including electromechanical positioning means electrically connected to said control unit for receiving control signals therefrom and orienting said sensor means to view the sun;

a receiver means electrically connected to said control unit and mounted adjacent to said mirror array means, said receiver means including a radiation receiver surface facing said mirror array means, said receiver means including radiation detector means mounted adjacent to said radiation receiver surface for detecting when the center of the common focus of said mirror array means is not centered on said radiation receiver surface, said radiation detector means generating electrical signals indicative of the direction the common focus must be moved to be centered on said radiation receiver surface that are transmitted to said control unit, said control unit upon receiving a signal from said radiation detector means transmitting electrical control signals to said electromechanical means to cause rotations of said mirrors and operating to disable said sun tracker means to permit small corrections in orientations of said mirrors by said receiver means;

tilt detector means electrically connected to said control unit and mounted in said system for detecting large anomalies between said sun tracker orientation and the direction of the sun that exceed the correction capabilities of the sun tracker, said tilt detector means generating electrical signals in response to such anomalies that are transmitted to said control unit which in turn transmits electrical control signals to said sun tracker means and said mirror array means to cause said sun tracker to acquire the sun, whereby after sun acquisition the sun tracker means and receiver means controlling the orientation of said rotatable mirrors.

2. A central focus solar energy system as recited in claim 1 wherein said electromechanical means comprise:

electromagnetic device means for receiving electrical command signals from said control unit means and developing useable rotational outputs in response thereto;

mechanical coupling means connecting said mirrors and said electromagnetic device means for translating rotational outputs generated by said electromagnetic device means into the individual and uniform rotation of said mirrors.

3. A central focus solar energy system a recited in claim 2 wherein said mechanical coupling means comprise:

a plurality of mirror principal axis control brackets each pivotably mounted in said framework to rotate about a said mirror principal axis of rotation for each bracket, at least one said mirror principal axis control bracket being connected to said electromagnetic device means;

a plurality of mirror articulating arms pivotably mounted in each said bracket for rotation about a said mirror secondary axis of rotation such that said mirror secondary axes of rotation of said plurality of said arms are parallel and each said mirror secondary axis of rotation is perpendicular to, rotates about and intersects the said mirror principal axis of rotation about which the said bracket is rotatable at the said mirror center of rotation;

a mirror control bar for each said bracket to which each said plurality of arms is pivotably coupled such that any movement or rotation of said bar results in the individual and uniform rotation of all said arms mounted in said bracket, said movement of said bar in a plane including said mirror principal axis of rotation of said bracket causing the individual and uniform rotation of all said arms mounted in said bracket about said mirror secondary axes of rotation of said arms, said rotation of said bar about said mirror principal axis of rotation of said bracket causing the individual and uniform rotation of all said arms mounted in said brackets about said mirror principal axis of said bracket;

lever assemblies connecting at least two said bars for any said mirror array to said electromagnetic device means, said lever assemblies including said arms;

tie rods connected to corresponding ends of said bars such that any movement or rotation of any said bar of said mirror array results in the the individual and uniform movement or rotation of all said bars of said mirror array;

mirror/mirror articulating arm coupling means whereby each said arm is coupled to said mirror such that said coupled mirror and said arm are rotatable as a unit about said mirror center of rotation.

4. A central focus solar energy system as recited in claim 1 wherein said sun tracker sensor means comprise:

four contiguous compartments, each said compartment having four sides and two ends, said compartment sides being parallel to said sun tracker sensor longitudinal axis, said longitudinal axis intersecting said sun tracker sensor center of rotation and being perpendicular to the plane containing the said sun tracker sensor principal axis of rotation and said sun tracker sensor secondary axis of rotation, each said compartment having one open side, said open side of two said compartments being parallel to said sun tracker sensor principal axis of rotation with open sides on opposite sides of said sensor, said open sides of the other two compartments being parallel to said sun tracker sensor secondary axis of rotation with open sides on opposite sides of said sensor;

each said compartment open side exposing a trough in which a light-sensitive device is mounted to detect-tracking errors, said sun-tracking errors being nonalignments of said sensor longitudinal axis and a straight line connecting said sun tracker sensor center of rotation and the center of the sun;

each said light-sensitive device being shaded by a sun-shadowing fence at the sun end of each said compartment during a condition of no said sun-tracking error, said sun-tracking error causing at least one of said light-sensitive devices to be illuminated by the direct rays of the sun, said direct rays causing outout signals to be sent to said control unit means;

said sun tracker sensor rotations about said sensor principal axis of rotation being controlled by said electromagnetic device means mounted on said sun tracker support and coupled to said gimbal means;

said sun tracker sensor rotations about said sensor secondary axis of rotation being controlled by said electromagnetic device means mounted on said gimbal means and coupled to said sun tracker sensor.

5. A central focus solar energy system as recited in claim 1 wherein said receiver means comprise:

a mirror-facing surface centered at said common focus of said plurality of mirrors and parallel to the plane formed by said centers of rotation of said mirrors, said mirror-facing surface having four sides and being of sufficient size as to permit reflections of the direct rays of the sun from all of said mirrors, when properly focused, to fall on said mirror-facing surface;

the radiation detection means comprises two principal axis light-sensitive devices mounted on opposite sides of said mirror-facing surface such that a straight line connecting the centers of said principal axis light-sensitive devices, intersects the center of said common focus and is perpendicular to said mirror principal axes of rotation; and two secondary axis light-sensitive devices mounted on opposite sides of said mirror-facing surface such that a straight line connecting the centers of said secondary axis light-sensitive devices intersects the center of said common focus and is parallel to said mirror principal axes of rotation; said light-sensitive devices mounted on sides of said mirror-facing surface being illuminated by reflections of the direct rays of the sun from said mirrors when said reflections illuminate said receiver but are not centered on said mirror-facing surface;

said illuminations causing output signals to be sent to said control unit means;

a receiver support arm to support said receiver in a fixed position with respect to said mirrors.

6. A central focus solar energy system as recited in claim 1 wherein said tilt detector means comprise:

a west looking light-sensitive device, said west looking light-sensitive device being exposed to illumination by the direct rays of the sun subsequent to solar noon;

an east looking light-sensitive device, said east looking light-sensitive device being exposed to illumination by the direct rays of the sun prior to solar noon;

an east tilt mercury switch mounted in said sun tracker sensor, said east tilt mercury switch being in a closed position when said sun tracker sensor is tilted east of said sensor's solar noon position; said east tilt mercury switch being open when said sensor is at or tilted west of the said sensor's solar noon position;

a west tilt mercury switch mounted in said sun tracker sensor, said west tilt switch being in a closed position when said sensor is tilted west of the said sensor solar noon position; said west tilt mercury switch being in an open position when said sensor is at or tilted east of the said sensor's solar noon position;

said west looking light-sensitive device and said east tilt mercury switch being electrically connected in series such that the illumination of said west looking light-sensitive device by the direct rays of the sun while said east tilt mercury switch is in the closed position causes a signal to be sent to said control unit means;

said east looking light-sensitive device and said west tilt mercury switch being electrically connected in series such that the illumination of said east looking light-sensitive device by the direct rays of the sun while said west tilt mercury switch is in the closed position causes a signal to be sent to said control unit means.

7. A central focus solar energy system as recited in claim 1 wherein said electromagnetic device means comprise:

a sun tracker sensor principal axis control motor means with gear reduction and one or more mirror principal axis control motor means with gear reductions, said gear reductions with said sun tracker sensor principal axis control motor means and with said mirror principal axis control motor means being according to equation:

$$\frac{dM_p}{dt} = \frac{1}{2} \frac{dT_p}{dt}$$

wherein:

$dM_p/dt$ is the rotational rate with respect to time of said mirrors about said mirror principal axes of rotation;

$dT_p/dt$ is the rotational rate with respect to time of said sun tracker sensor about said sun tracker sensor principal axis of rotation as said sun tracker tracks the sun;

a sun tracker sensor secondary axis control motor means with gear reduction and at least two mirror secondary axis control motor means with gear reduction, said gear reductions with said sun tracker sensor secondary axis control motor means and with said mirror secondary axis control motor means being according to equation:

$$\frac{dM_s}{dt} = \frac{1}{2} \frac{dT_s}{dt}$$

wherein:

$dM_s/dt$ is the rotation rate with respect to time of said mirrors about said mirror secondary axes of rotation;

$dT_p/dt$ is the rotational rate with respect to time of said sun tracker sensor about said sun tracker sensor secondary axis of rotation as said sun tracker tracks the sun.

8. A central focus solar energy system as recited in claim 6 wherein said control motor means are stepping motors.

9. A central focus solar energy system as recited in claim 1 wherein said control unit means comprise:

a principal axis control motor command source for receiving electrical signals pertinent to rotational control about said principal axes of rotation originating in said sun tracker sensor, said receiver or said tilt detector and transmitting appropriate electrical command signals to said sun tracker sensor principal axis control motor and said mirror principal axis control motor or motors;

a secondary axis control motor command source for receiving electrical signal pertinent to rotational control about said secondary axes of rotation originating in said sun tracker sensor, said receiver or said tilt detector and transmitting appropriate electrical command signals to said sun tracker sensor secondary axis control motor and said mirror secondary axis control motors;

a capability to immobilize said sun tracker sensor when any said receiver light-sensitive device is illuminated by reflections of the direct rays of the sun by said mirrors, said sun tracker sensor being reactivated and said mirrors being immobilized when said receiver light-sensitive devices are no longer so illustrated, said mirrors remaining immobilized for a period of time of sufficient duration to permit said sun tracker sensor to automatically eliminate said sun-tracking errors.

10. A central focus solar energy system as recited in claim 3 wherein said mirror/mirror articulating arm coupling means comprise:

mirror articulating arms each comprising: two secondary shafts for pivotably mounting said arm on said mirror principal axis control bracket, the axis of said shafts, when said arm is mounted on said bracket, being aligned with the associated said mirror secondary axis of rotation; a ball socket consisting of two ball socket halves, said ball socket being located between said shafts with said ball socket halves being on opposite sides of said arm such that when said arm is mounted on said bracket, the center of said ball socket is coincident with the associated said mirror center of rotation, and a straight line drawn thru centers of ball recesses of said ball socket halves is conincident with the associated mirror principal axis of rotation; a round hole thru said ball socket halves thru which a machine screw may be inserted for purposes of drawing said ball socket halves more closely together, said hole being at sufficient distance from the center of said ball socket as to permit rotational movement of a ball of size to correspond to size of said ball socket, said hole being parallel to said mirror principal axis of rotation with said arm mounted in said bracket; a second round hole near the base of said arm, said hole axis being parallel to said secondary axes shafts such that a machine screw inserted thru corresponding holes in said mirror control bar and said hole is said arm pivotably couples said arm and said bar;

a mirror focusing ball assembly with ball of size to fit into said ball socket, said mirror focusing ball assembly including a mirror mounting plate, said mirror mounting plate being affixed to the back of said mirror; said arm and said mirror being loosely coupled by inserting ball in said ball socket, said mirror attached to said mirror focusing ball assembly being manually adjustable for focusing of said mirror by rotating said mirror focusing ball assembly in said ball socket;

a machine screw with locking nut, said machine screw being inserted in said hole thru ball socket halves, said nut being tightened following mirror focusing to prevent said mirror focusing ball assembly from rotating in said ball socket.

* * * * *